Fig. 5.
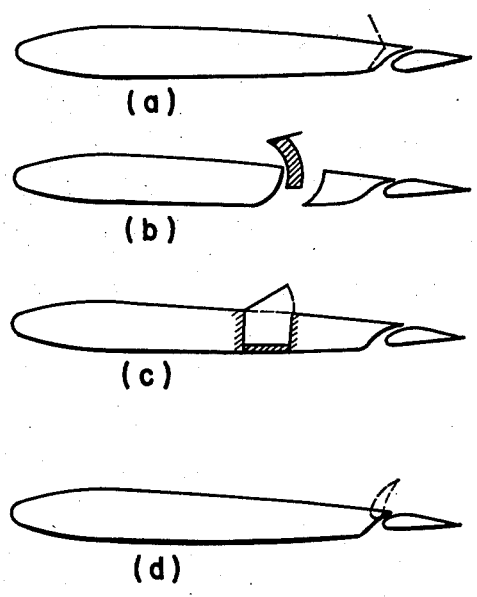
Fig. 6. Fig. 7.
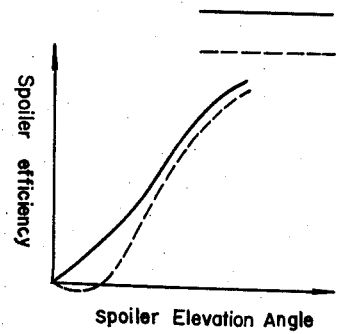
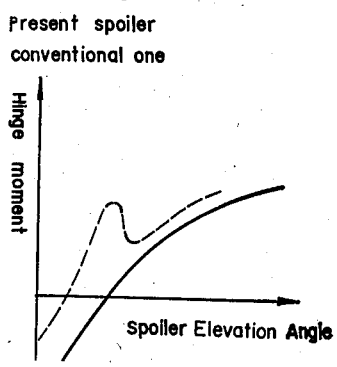

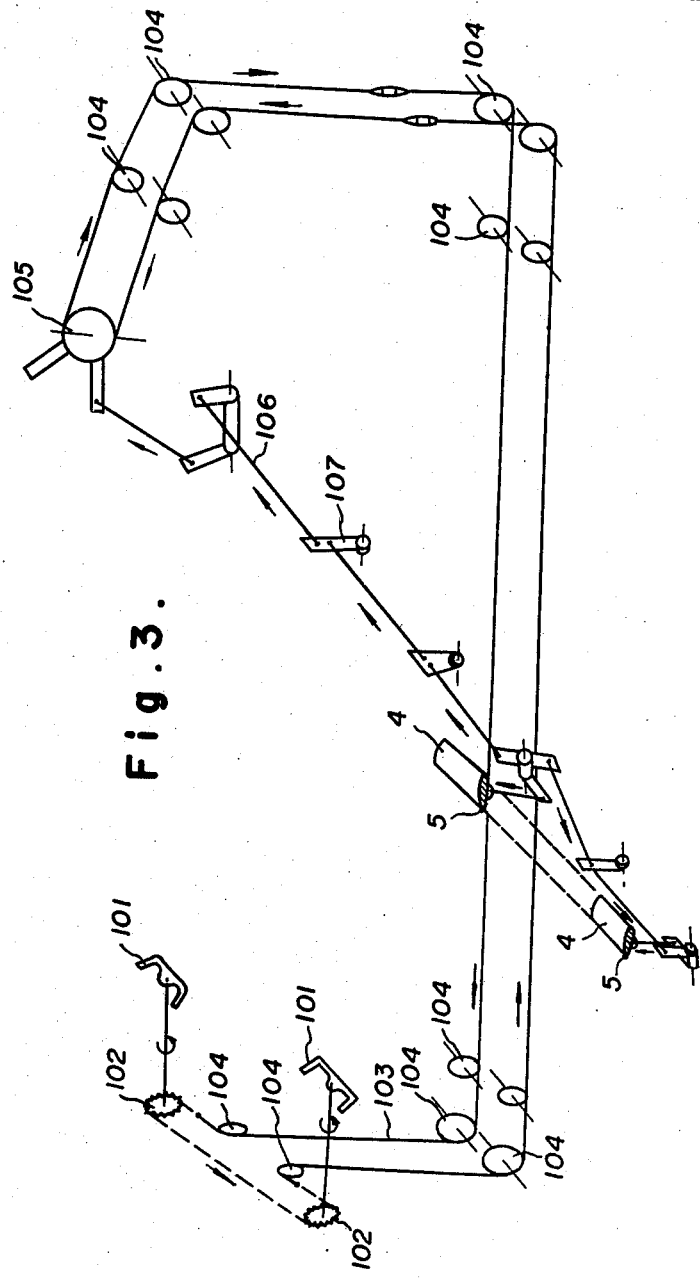

United States Patent Office 3,191,887
Patented June 29, 1965

3,191,887
SPOILER
Minoru Ikai, Nishi-ku, Nagoya, and Kazuo Arashi, Koonji-cho, Kita-ku, Nagoya, Japan, assignors to Shin-Mitsubishi Jukogyo Kabushiki Kaisha, Tokyo, Japan
Filed Sept. 6, 1963, Ser. No. 307,236
Claims priority, application Japan, Sept. 20, 1962, 37/40,883
1 Claim. (Cl. 244—42)

The present invention relates to a spoiler.

Conventionally, in order to improve the performance of airplanes, such as its take-off performance and the like, it is known to mount a device for increasing the lift force, such as a flap, on the trailing edge of the main wing across the whole wing span thereof with various kinds of spoilers constituting a lateral control system in place of the conventional aileron. However, such construction has various aerodynamic defects. For instance, in the projection-type the spoiler efficiency is good at the small elevation angle, but the hinge moment characteristic becomes irregular due to the condition of the flap operation; in a plug type spoiler, the main wing with a spoiler provided thereon must be of a long cut construction in the wing span direction, thereby causing a problem in the strength of the wing; in the hinged flap type spoiler, the efficiency at small elevation angles is low and the hinge moment becomes particularly irregular when the flap is at a down position; and in the slot-lip type spoiler, the configuration of the slot-lip is limited by the flap device and the characteristic of hinge moment becomes bad.

Therefore, it is an object of the present invention to provide a spoiler without the above mentioned defects in the prior art.

Another object of the present invention is to provide a spoiler of good aerodynamic characteristics.

A further object of the present invention is to provide a spoiler of simple construction.

A further object of the present invention is to provide a spoiler having a spoiler member mounted rotatably at its leading edge on the upper face of the main wing and enabling effective separation of the air flow on said main wing by emitting at approximately, a right angle, an air current, the quantity of which conforms to the spoiler elevation angle, through a gap between the trailing edge of said spoiler member and the upper face of the main wing.

A further object of the present invention is to provide a spoiler which does not disturb the aerodynamic performance of the main wing when the spoiler is inoperative, by accommodating the spoiler member in a recess in the main wing, at which time the upper surface of the spoiler member is aligned and coextensive with the upper face of the main wing.

Other objects and advantages according to the present invention and claims will be apparent from the following description and claims taken in connection with the accompanying drawings, in which:

FIG. 3 is a diagrammatic view of the spoiler operating mechanism;

FIG. 5 shows sectional views of wings provided with spoilers according to the prior art; and FIGS. 6 and 7 are characteristic curve diagrams of performance of the spoiler of this invention and those in the prior art showing them in comparison with each other.

Figure 1:
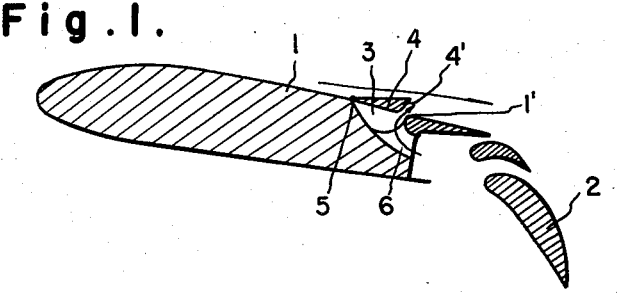
FIG. 1 is a sectional view of a wing and a spoiler according to a first embodiment of the present invention.

In FIG. 1, 1 is a main wing, 2 is a flap fitted on the trailing edge of the main wing 1, 3 in a recess formed on the upper surface of the main wing 1, and a spoiler member 4 is secured by a hinge 5 to the main wing at a side of said recess 3 closer to the leading edge of the main wing 1. The spoiler member 4 is accommodated in said recess 3 when inoperative, at which time the upper face of said spoiler member 4 is aligned and coextensive with the upper face of the main wing 1, thereby constituting a continuous upper contour. 6 represents means establishing a communicating opening connecting recess 3 with a space at the juncture of the main wing 1 and the flap 2 at the trailing edge of the spoiler member. The means 6 constitutes an air-current blow-off arrangement.

The spoiler operating mechanism may be constituted similar to that used in a conventional spoiler or aileron. An example thereof is shown in FIG. 3. In FIG. 3, 101 are handles adapted to be operated by the pilot. Chain gears 102 are connected to the handles 101 and an endless chain or cable 103 extends between the chain gears 102 and sprocket 105, said cable 103 being tightened by a plurality of pulleys 104. 106 is a connecting means such as a cable connecting the sprocket 105 with the spoiler members 4, and 107 are intermediate supporting members for the connecting means.

In the above mentioned mechanism, when one of the handles 1, is rotated as shown by arrow in FIG. 3, the endless cable 103 is displaced as shown by an arrow, and the sprocket 105 is rotated around its axis. The rotation of the sprocket 105 is conveyed to the spoiler members 4 by the connecting means 106, and the spoiler member 4 is rotated around the hinges 5.

In the above mentioned spoiler, when the spoiler is actuated thereby turning the spoiler member 4 upwards around the hinge 5, a slit-form gap 7 conforming to the spoiler elevation angle is formed between the trailing edge 4' of the spoiler member 4 and the end part 1' of the recess 3 provided on the upper part of the main wing 1.

The high-pressure air-current emitted from the upper face of the main wing 1 in the rear of the spoiler member 4 will further promote separation of the air-current along the surface of the main wing separated by the spoiler member 4, thereby widely improving the efficiency of the spoiler. In the prior art, particularly for small spoiler angles, there was a deficiency, in that, the air-current separated from the surface of the main wing 1 re-adheres on the surface thereof, thereby adversely affecting the action of the spoiler. On the contrary, in the present invention, such a defect is eliminated.

Figure 2:
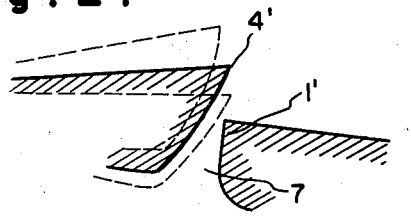
FIG. 2 is an enlarged sectional view of the spoiler shown in FIG. 1.
Figure 4:
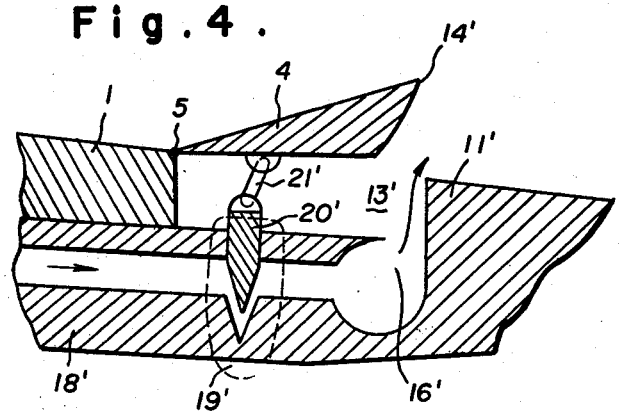
FIG. 4 is a sectional view of another embodiment of spoiler of this invention.

In the embodiments shown in FIGS. 1 and 2, the high-pressure air-current generated at the juncture of flap 2 with the main wing 1 at the lower face thereof is used as the source of high pressure air to be emitted through the slit-form gap 7 formed between the trailing edge part 4' of the spoiler member 4 and the end part 1' of the recess 3 at the trailing edge side of the main wing 1. However, as shown in the FIG. 4, the air from a suitable high pressure air source or air extracted under pressure from the turbine engine is used instead of the above mentioned high-pressure air. Such high pressure air is conducted through the communicating opening 16' by the pipe 18' into the recess 13' provided on the main wing 1, and the amount thereof may be regulated by means of a valve control 19' provided in the pipe 18' and coacting with the spoiler so as to conform the amount of the air to the angle of the spoiler. The said valve control 19' has a valve 20' connected ot the lower surface of the spoiler by a link 21'.

As above explained, the spoiler of the present invention consists of a spoiler member with its leading edge mounted rotatably on the upper face of the main wing, and an air-current blow-off device which emits, through the gap formed between the trailing edge of the spoiler member and the upper face of the main wing, a high pressure air current in an amount related to the spoiler angle, in a direction approximately at right angles with the upper face of the main wing.

Furthermore, in the spoiler of the present invention, the separation of the air-current at the upper face of the main wing by the spoiler member is further promoted by the high pressure air-current emitted by the air current blow-off device through the gap formed between the trailing edge of the spoiler member and the upper face of the main wing.

In FIGS. 6 and 7 respectively showing the spoiler efficiency and the hinge moment along the ordinate, and the spoiler elevation angles along the abscissa, the spoiler efficiency, especially at small elevation angles is increased, while the characteristics of the hinge moment are greatly improved.

It will be obvious to those skilled in the art that the present invention is not limited to the specific construction described herein, but covers all modifications and variations without departing from the scope of the invention as defined in the attached claim.

What is claimed is:

A spoiler for the wing of an airplane, said spoiler comprising a spoiler member, said wing having a recess in the upper surface thereof, means hingeably supporting the spoiler member at the leading edge thereof to the wing at the leading edge of the recess, said spoiler member being movable between a raised operative position and a lowered inoperative position in which the spoiler member is accommodated in the recess, said spoiler member having a trailing edge which is spaced from the wing when the spoiler member is raised to thereby form a gap between the trailing edge of the spoiler member and the wing, and means adapted for connection with a source of high pressure air and including a conduit for introducing high pressure air into said recess and through said gap in a direction substantially normal to the upper surface of the wing, and valve means in said conduit and connected with said spoiler for controlling the quantity of high pressure air conveyed to the recess to supply an amount thereto related to the elevation angle of the spoiler as the same is raised.

References Cited by the Examiner

UNITED STATES PATENTS

| | | | |
|---|---|---|---|
| 2,261,363 | 11/41 | Griswold | 244—42 X |
| 2,329,177 | 9/43 | Baker | 244—42 |
| 2,518,854 | 8/50 | Badenoch | 244—42 |
| 2,969,206 | 1/61 | Jensen | 244—42 |
| 3,045,947 | 7/62 | Bertin et al. | 244—42 X |
| 3,092,354 | 6/63 | Alvarey-Calderon | 244—42 X |

MILTON BUCHLER, *Primary Examiner.*